(12) United States Patent
Volpano (10) Patent No.: US 7,886,354 B2
(45) Date of Patent: *Feb. 8, 2011

(54) METHOD AND APPARATUS FOR LOCAL AREA NETWORKS

(75) Inventor: Dennis Michael Volpano, Salinas, CA (US)

(73) Assignee: Microsoft Corporation, Redmond, WA (US)

( * ) Notice: Subject to any disclaimer, the term of this patent is extended or adjusted under 35 U.S.C. 154(b) by 320 days.

This patent is subject to a terminal disclaimer.

(21) Appl. No.: 11/841,863

(22) Filed: Aug. 20, 2007

(65) Prior Publication Data

US 2008/0301442 A1 Dec. 4, 2008

Related U.S. Application Data

(63) Continuation of application No. 11/432,844, filed on May 12, 2006, now Pat. No. 7,644,437.

(60) Provisional application No. 60/343,307, filed on Dec. 20, 2001.

(51) Int. Cl.
   G06F 21/20 (2006.01)
   G06F 15/16 (2006.01)
   H04L 9/00 (2006.01)
   H04K 1/00 (2006.01)

(52) U.S. Cl. .............................. 726/15; 726/4; 709/220; 709/249

(58) Field of Classification Search ........................ None
See application file for complete search history.

(56) References Cited

U.S. PATENT DOCUMENTS 4,919,545 A   4/1990  Yu (Continued)

FOREIGN PATENT DOCUMENTS

EP   0939519 A1   9/1999

(Continued)

OTHER PUBLICATIONS

Butler, et al., A national-scale authentication infrastructure, Computer, vol. 33, Issue 12, Dec. 2000 pp. 60-66.

(Continued)

*Primary Examiner*—Christopher A Revak
(74) *Attorney, Agent, or Firm*—Shook, Hardy & Bacon L.L.P.

(57) ABSTRACT

A mechanism for segregating traffic amongst STAs that are associated with a bridge, referred to herein as the personal virtual bridged local area network (personal VLAN), is based upon the use of a VLAN to segregate traffic. The IEEE 802.1Q-1998 (virtual bridged LANs) protocol provides a mechanism that is extended by the invention to partition a LAN segment logically into multiple VLANs. In the preferred embodiment, a VLAN bridge forwards unicast and group frames only to those ports that serve the VLAN to which the frames belong. One embodiment of the invention extends the standard VLAN bridge model to provide a mechanism that is suitable for use within an AP. In a preferred embodiment, the Personal VLAN bridge extends the standard VLAN bridge in at least any of the following ways: VLAN discovery in which a personal VLAN bridge provides a protocol for VLAN discovery; VLAN extension in which a Personal VLAN allows a station to create a new port that serves a new VLAN, or to join an existing VLAN via an authentication protocol; Logical ports in which a Personal VLAN bridge can maintain more than one logical port per physical port, and bridges between ports of any kind; and cryptographic VLAN separation.

34 Claims, 7 Drawing Sheets

U.S. PATENT DOCUMENTS

| | | | |
|---|---|---|---|
| 5,550,984 A | 8/1996 | Gelb | |
| 5,619,657 A | 4/1997 | Sudama et al. | |
| 5,764,890 A | 6/1998 | Glasser et al. | |
| 5,790,800 A | 8/1998 | Gauvin et al. | |
| 5,822,431 A | 10/1998 | Sprunk | |
| 5,918,019 A | 6/1999 | Valencia | |
| 5,940,591 A | 8/1999 | Boyle et al. | |
| 5,963,556 A * | 10/1999 | Varghese et al. | 370/401 |
| 5,978,378 A | 11/1999 | Van Seters et al. | |
| 6,003,137 A | 12/1999 | Kawasaki | |
| 6,035,105 A | 3/2000 | McCloghrie et al. | |
| 6,035,405 A | 3/2000 | Gage et al. | |
| 6,041,358 A * | 3/2000 | Huang et al. | 709/238 |
| 6,047,325 A | 4/2000 | Jain et al. | |
| 6,061,796 A | 5/2000 | Chen et al. | |
| 6,070,243 A | 5/2000 | See et al. | |
| 6,085,238 A | 7/2000 | Yuasa et al. | |
| 6,157,647 A | 12/2000 | Husak | |
| 6,181,699 B1 | 1/2001 | Crinion et al. | |
| 6,226,751 B1 | 5/2001 | Arrow et al. | |
| 6,237,093 B1 | 5/2001 | Vatanen | |
| 6,308,213 B1 | 10/2001 | Valencia | |
| 6,311,218 B1 | 10/2001 | Jain et al. | |
| 6,339,830 B1 | 1/2002 | See et al. | |
| 6,414,956 B1 | 7/2002 | Szczepanek | |
| 6,487,598 B1 | 11/2002 | Valencia | |
| 6,615,357 B1 | 9/2003 | Boden et al. | |
| 6,636,898 B1 | 10/2003 | Ludovici et al. | |
| 6,639,901 B1 | 10/2003 | Katzri et al. | |
| 6,640,302 B1 | 10/2003 | Subramaniam et al. | |
| 6,675,225 B1 | 1/2004 | Genty et al. | |
| 6,697,943 B1 | 2/2004 | Frantz | |
| 6,701,437 B1 | 3/2004 | Hoke et al. | |
| 6,728,249 B2 | 4/2004 | Chang | |
| 6,798,751 B1 | 9/2004 | Voit et al. | |
| 6,847,620 B1 | 1/2005 | Meier | |
| 6,874,090 B2 | 3/2005 | See et al. | |
| 6,898,791 B1 | 5/2005 | Chandy et al. | |
| 6,912,592 B2 | 6/2005 | Yip | |
| 6,917,614 B1 | 7/2005 | Laubech et al. | |
| 6,920,502 B2 | 7/2005 | Araujo et al. | |
| 6,954,790 B2 | 10/2005 | Forslow | |
| 6,961,762 B1 | 11/2005 | Yeap | |
| 6,970,459 B1 | 11/2005 | Meier | |
| 6,970,941 B1 | 11/2005 | Caronni et al. | |
| 6,976,177 B2 | 12/2005 | Ahonen | |
| 7,000,121 B2 | 2/2006 | Jarosz | |
| 7,028,337 B2 | 4/2006 | Murakawa | |
| 7,042,852 B2 | 5/2006 | Hrastar | |
| 7,055,171 B1 | 5/2006 | Martin et al. | |
| 7,058,796 B2 | 6/2006 | Lynn | |
| 7,069,437 B2 | 6/2006 | Williams | |
| 7,086,089 B2 | 8/2006 | Hrastar et al. | |
| 7,088,714 B2 | 8/2006 | Athreya et al. | |
| 7,093,027 B1 | 8/2006 | Shabtay et al. | |
| 7,107,464 B2 | 9/2006 | Shapira et al. | |
| 7,130,904 B2 | 10/2006 | Kitchin | |
| 7,151,762 B1 | 12/2006 | Ho et al. | |
| 7,164,912 B2 | 1/2007 | Buckley et al. | |
| 7,174,390 B2 | 2/2007 | Schulter et al. | |
| 7,181,542 B2 | 2/2007 | Tuomenoksa et al. | |
| 7,188,180 B2 | 3/2007 | Larson et al. | |
| 7,194,622 B1 | 3/2007 | Halasz et al. | |
| 7,203,957 B2 | 4/2007 | Balissat et al. | |
| 7,209,479 B2 | 4/2007 | Larson | |
| 7,313,135 B2 * | 12/2007 | Wyatt | 370/389 |
| 7,401,354 B2 | 7/2008 | Boden et al. | |
| 7,434,047 B2 * | 10/2008 | Sharma | 713/163 |
| 7,478,427 B2 | 1/2009 | Mukherjee et al. | |
| 2001/0048744 A1 | 12/2001 | Kimura | |
| 2002/0027906 A1 | 3/2002 | Athreya et al. | |
| 2002/0071448 A1 | 6/2002 | Cervello et al. | |
| 2002/0091795 A1 | 7/2002 | Yip | |
| 2002/0143960 A1 | 10/2002 | Goren et al. | |
| 2002/0163920 A1 | 11/2002 | Walker et al. | |
| 2002/0174335 A1 | 11/2002 | Zhang et al. | |
| 2002/0178240 A1 | 11/2002 | Fiveash et al. | |
| 2002/0178361 A1 | 11/2002 | Genty et al. | |
| 2002/0199021 A1 | 12/2002 | Beier et al. | |
| 2003/0037125 A1 | 2/2003 | Luman et al. | |
| 2003/0037169 A1 | 2/2003 | Kitchin | |
| 2003/0037258 A1 | 2/2003 | Koren | |
| 2003/0112820 A1 | 6/2003 | Beach | |
| 2003/0120763 A1 | 6/2003 | Volpano | |
| 2003/0227893 A1 | 12/2003 | Bajic | |
| 2004/0054902 A1 | 3/2004 | Fujimoto et al. | |
| 2004/0083295 A1 | 4/2004 | Amara et al. | |
| 2004/0093431 A1 | 5/2004 | Genty et al. | |
| 2004/0107285 A1 | 6/2004 | Larson et al. | |
| 2004/0111520 A1 | 6/2004 | Krantz et al. | |
| 2004/0117653 A1 | 6/2004 | Shapira et al. | |
| 2004/0255164 A1 | 12/2004 | Wesemann | |
| 2005/0055306 A1 | 3/2005 | Miller et al. | |
| 2005/0210237 A1 | 9/2005 | Balaz et al. | |
| 2005/0223111 A1 | 10/2005 | Bhandaru et al. | |
| 2005/0226257 A1 | 10/2005 | Mirzabegian et al. | |
| 2005/0283604 A1 | 12/2005 | Deshpande et al. | |
| 2006/0070115 A1 | 3/2006 | Yamada et al. | |
| 2006/0077926 A1 | 4/2006 | Rune | |
| 2006/0077977 A1 | 4/2006 | Caronni et al. | |
| 2007/0271606 A1 | 11/2007 | Amann et al. | |
| 2007/0288615 A1 * | 12/2007 | Keohane et al. | 709/223 |

FOREIGN PATENT DOCUMENTS

| | | |
|---|---|---|
| JP | 10136438 | 5/1998 |
| WO | 02058336 A2 | 7/2002 |

OTHER PUBLICATIONS

Garg et al., Scheduling algorithms for bounded delay service in virtual networks, Global Telecommunications Conference, 1999. GLOBECOM '99, vol. 2, 1999, pp. 1318-1322.

Redlich et al., Virtual networks in the Internet, Open Architectures and Network Programming Proceedings, 1999. OPENARCH '99. 1999 IEEE Second Conference on Mar. 26-27, 1999, pp. 108-114.

Venkateswaran et al., Virtual private networks, Potentials, IEEE, vol. 20, Issue 1, Feb.-Mar. 2001, pp. 11-15.

Bernard Aboba, Virtual Access Points, IEEE P802.11 Wireless LANs, May 22, 2003, Microsoft, and pp. 1-13.

Security Task Group of IEEE 802.1, Draft Standard for Local and Metropolitan Area Networks: Media Access Control (MAC) Security), IEEE P802.1AE/D5.1 (Jan. 19, 2006), pp. 1-150.

IEEE Computer Society, IEEE Standards for Local and Metropolitan Area Networks: Virtual Bridged Local Networks, IEEE std 802.1Q 2003 Edition (May 7, 2003), pp. 1-312.

Kent et al, "Security Architecture for the Internet Protocol", Nov. 1998, Network Working Group Request for Comments, RFC 2401, pp. 1-62.

Rosen et al, "BGP/MPLS VPNs" Mar. 1999, Network Working Group Request for Comments, RFC 2547, pp. 1024.

Maughan et al, "Internet Security Association and Key Management Protocol (ISAKMP)", Nov. 1998, Network Working Group Request for Comments, RFC 2408, pp. 1-81.

Madson, C., "The Use of HMAC-MD5-96 within ESP and AH", Nov. 1998, Network Working Group Request for Comments, RFC 2403, pp. 1-7.

European Search Report dated May 20, 2010, 6 pages.

* cited by examiner

METHOD AND APPARATUS FOR LOCAL AREA NETWORKS

CROSS-REFERENCE TO RELATED APPLICATIONS

This application is a continuation of and claims priority to Ser. No. 11/432,844, now U.S. Pat. No. 7,644,437, filed May 12, 2006, which claims the benefit of Ser. No. 10/057,566, now U.S. Pat. No. 7,188,364, filed Jan. 25, 2002, which in turn claims the benefit of U.S. patent application Ser. No. 60/343,307 filed Dec. 20, 2001, all of which are incorporated by reference in their entirety for all purposes.

BACKGROUND OF THE INVENTION

1. Technical Field

The invention relates to local area networks. More particularly, the invention relates to a personal virtual bridged local area network.

2. Description of the Prior Art

An access point (AP) is a link-layer bridge between one or more stations (STAs) and a distribution system (DS). See IEEE 802.11, Wireless LAN Medium Access Control and Physical Layer Specifications, ISO/IEC 8802-11:1999(E), ANSI/IEEE Std 802.11, 1999 Edition. An example of a DS is a LAN segment, or an intranet. An AP enables packets to be transmitted via radio either from a station (STA) to the DS, or from the DS to a STA. An access point therefore has at least two physical ports. One is the DS interface and the other is a radio interface. Multiple STAs, each with their own radio interface, can send packets to the DS by multiplexing the single shared radio interface of an AP. The radio interface operates at a particular frequency and the STAs share the medium through a MAC-PHY protocol that guarantees mutually exclusive access to the medium. The DS also sends packets to STAs by using the same protocol.

The STA of an AP has a Basic Service Set ID (BSSID). It serves to partition 802.11 Basic Service Sets logically. Every STA that associates with an AP shares the AP's BSSID. A frame destined for a group address received by an AP or a STA is discarded if the BSS to which the AP or STA belong does not match the BSSID of the frame. In this sense, the BSSID behaves as a Virtual LAN ID (VID). See IEEE 802.1Q, IEEE Standards for Local and Metropolitan Area Networks: Virtual Bridged Local Area Networks, IEEE Std 802.1Q-1998. Every STA is therefore a member of the same virtual LAN (VLAN) as a consequence of associating with the same AP.

Every STA in a BSS, however, should not share the same VLAN unless the STAs trust each other. Yet in public space deployments, all STAs associated with an AP are required to share the same VLAN when typically there is no trust among them. This can make a STA vulnerable, for instance, to various link-layer attacks launched by an untrusted STA, such as Address Resolution Protocol (ARP) cache re-mapping.

It would be advantageous to provide a mechanism for segregating traffic amongst STAs that are associated with a bridge such that, for example, an untrusted STA associated with said bridge can not be used to launch a link layer (OSI Layer 2) attack on another STA associated with the same bridge.

SUMMARY OF THE INVENTION

The invention provides a mechanism for segregating traffic amongst STAs that are associated with a bridge such that, for example, an untrusted STA associated with said bridge can not be used to launch a link layer (OSI Layer 2) attack on another STA associated with the same bridge. The invention is based upon the use of a VLAN to segregate traffic. The IEEE 802.1Q-1998 (Virtual Bridged LANs) protocol provides a mechanism that is extended by the invention to partition a LAN segment logically into multiple VLANs. In the preferred embodiment, a VLAN bridge forwards unicast and group frames only to those ports that serve the VLAN to which the frames belong. One embodiment of the invention extends the standard VLAN bridge model to provide a mechanism that is suitable for use within an AP.

Suppose an AP is attached to a DS. Every STA that associates with the AP should have an opportunity to create a new VLAN with itself and the DS as its members. This way traffic between trusted and untrusted STAs can be separated even though they associate with the same AP. In general, if the DS comprises multiple VLANs, then the members of any subset of them can be members of the new VLAN. So there should be a way to discover existing VLANs. Furthermore, there should be a protocol for joining an existing VLAN. Creating a VLAN and joining an existing VLAN are both operations that require authentication. The IEEE Std 802.1Q-1998 VLAN model is deficient for such purposes because it does not provide these capabilities. The preferred embodiment of the invention comprises a mechanism for providing such capability, referred to herein as the personal virtual bridged local area network (Personal VLAN).

In a preferred embodiment, the Personal VLAN bridge extends the standard VLAN bridge in at least any of the following ways:

VLAN discovery: A Personal VLAN provides a protocol for VLAN discovery (discussed below).

VLAN extension/creation: A Personal VLAN bridge allows a station to create a new port that serves a new VLAN, or to join an existing VLAN or to join an existing VLAN via an authentication protocol.

Logical ports: A Personal VLAN bridge can maintain more than one logical port per physical port. It bridges between ports of any kind. A VLAN's member set is defined in terms of logical and physical ports. Every logical port has a lifetime controlled by the bridge.

Cryptographic VLAN separation: In a Personal VLAN, a logical port serves at most one VLAN. However, because there may be more than one logical port per physical port, more than one VLAN may exist on a physical port. Traffic within one VLAN is separated from another VLAN on the same physical port by cryptography. An authentication code uniquely identifies the VLAN to which the traffic belongs, while another level of encryption keeps the traffic private except to members of the VLAN.

Layer-2 VLAN support across routers: When an STA can roam and re-attach to a network at a different bridge, e.g. by associating with a new AP, the STA can inform the bridge of a VLAN to which it already belongs. The VLAN may have been created by a station, e.g. itself, at another bridge that links the VLAN with one or more logical or physical ports at that bridge. The STA can maintain its membership in the VLAN at layer 2 even though the new bridge may be located on a different subnet. This capability subsumes Mobile IP capability because Mobile IP aims to retain subnet membership for a station across routers. A subnet may correspond to a VLAN, but in general it does not.

Spanning tree maintenance: A Personal VLAN bridge permits an STA to create a VLAN where the STA itself is a bridge. A spanning tree algorithm eliminates cycles among bridges when membership is granted. The process for joining a personal VLAN enforces restrictions on VLAN topology that make re-constructing a spanning tree unnecessary after a new bridge joins a VLAN.

DETAILED DESCRIPTION OF THE INVENTION

The presently preferred embodiment of the invention provides a mechanism for segregating traffic amongst STAs that are associated with a bridge such that, for example, an untrusted STA associated with said bridge can not be used to launch a link layer (OSI Layer 2) attack on another STA associated with the same bridge. Those skilled in the art will appreciate that the invention disclosed herein is applicable to a wide range of systems and networks, including but not limited to wired and wireless networks.

The Personal VLAN Bridge Model

The invention is based upon the use of a VLAN to segregate traffic. The IEEE 802.1Q-1998 (Virtual Bridged LANs) protocol provides a mechanism that is extended by the invention to partition a LAN segment logically into multiple VLANs. In the preferred embodiment, a VLAN bridge forwards unicast and group frames only to those ports that serve the VLAN to which the frames belong. One embodiment of the invention extends the standard VLAN bridge model to provide a mechanism that is suitable for use within an AP.

Suppose an AP is attached to a DS. Every STA that associates with the AP should have an opportunity to create a new VLAN with itself and the DS as its members. This way traffic between trusted and untrusted STAs can be separated even though they associate with the same AP. In general, if the DS comprises multiple VLANs, then the members of any subset of them can be members of the new VLAN. So there should be a way to discover existing VLANs. Furthermore, there should be a protocol for joining an existing VLAN. Creating a VLAN and joining an existing VLAN are both operations that require authentication. The IEEE Std 802.1Q-1998 VLAN model is deficient for such purposes because it does not provide these capabilities.

The preferred embodiment of the invention comprises a mechanism for providing such capability, referred to herein as the personal virtual bridged local area network (Personal VLAN).

Figure 1:
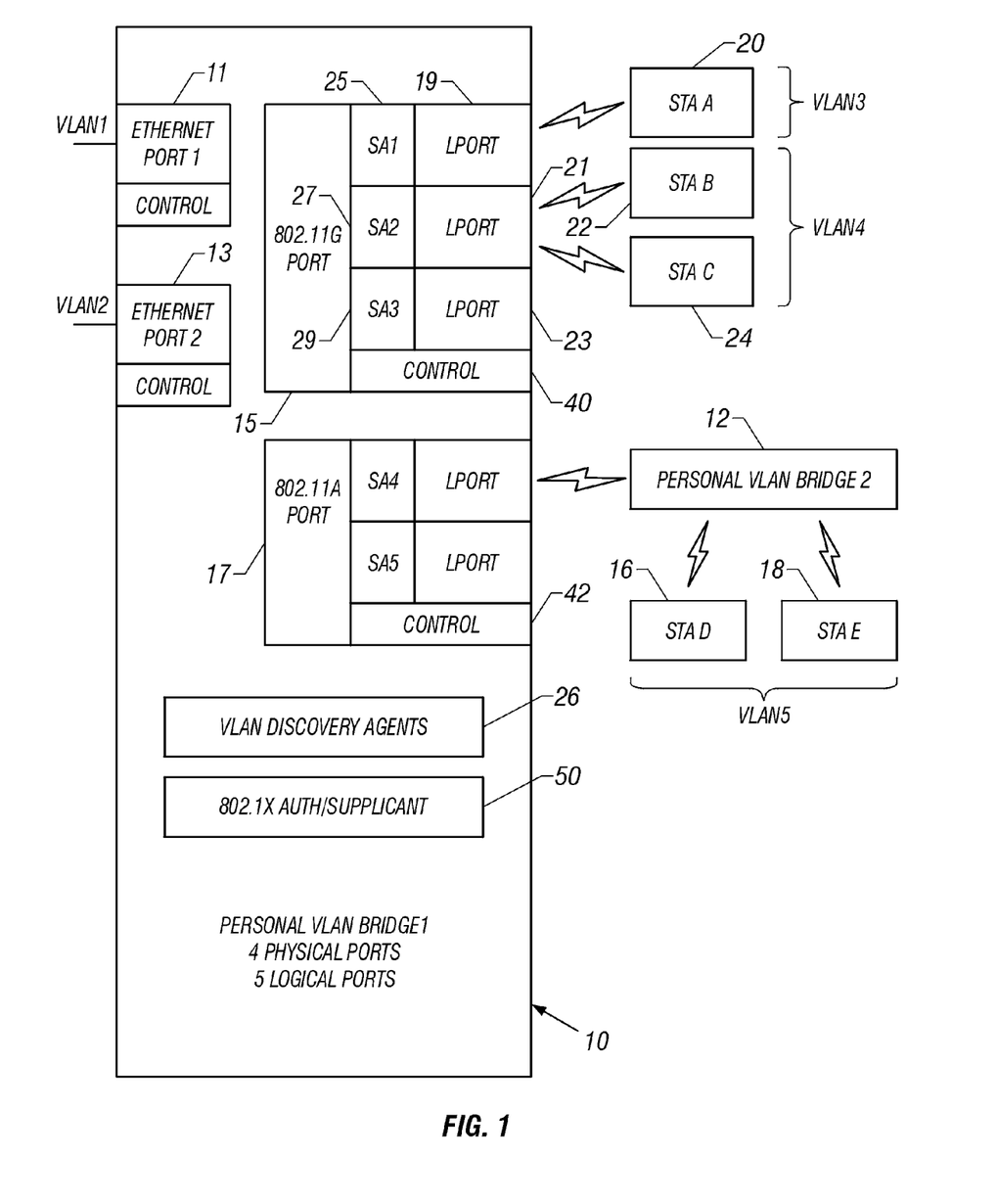
FIG. 1 is a block schematic diagram that illustrates two bridges in a Personal VLAN network according to the invention.
Figure 2:
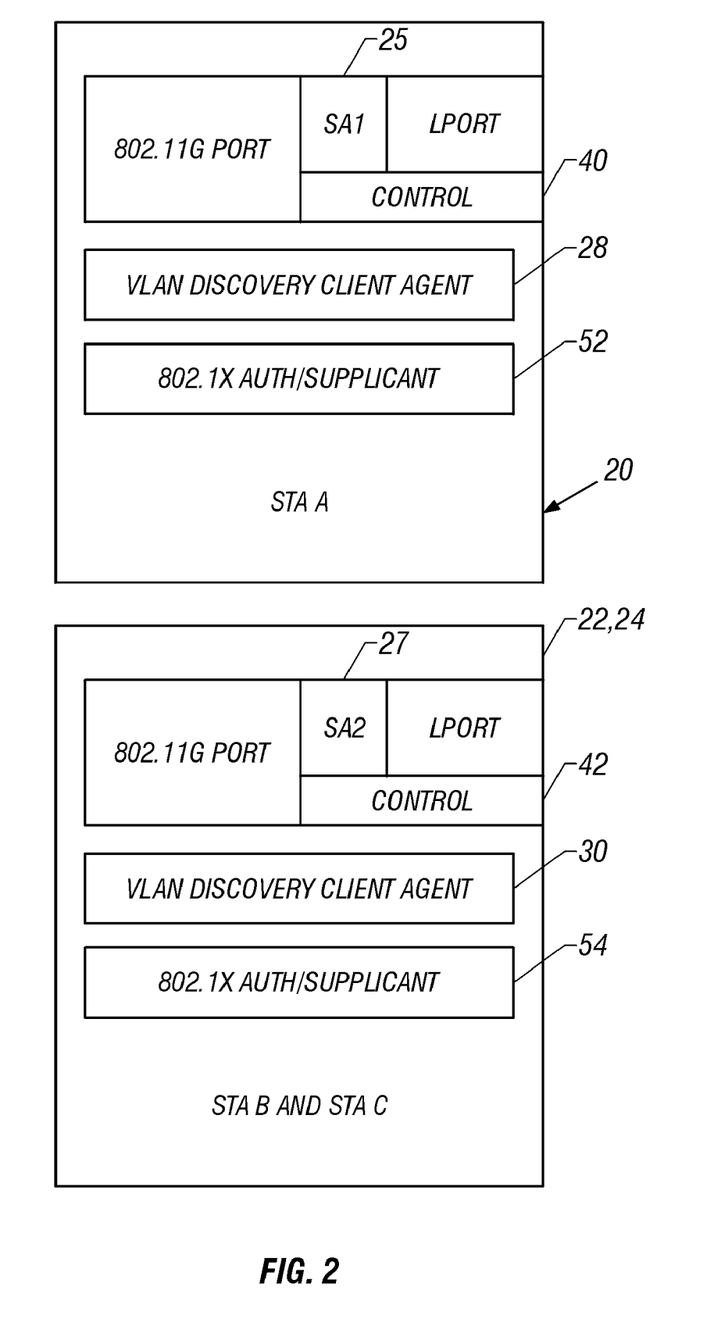
FIG. 2 is a block schematic diagram which shows an embodiment in which station A shares SA1 with bridge 1.
Figure 3:
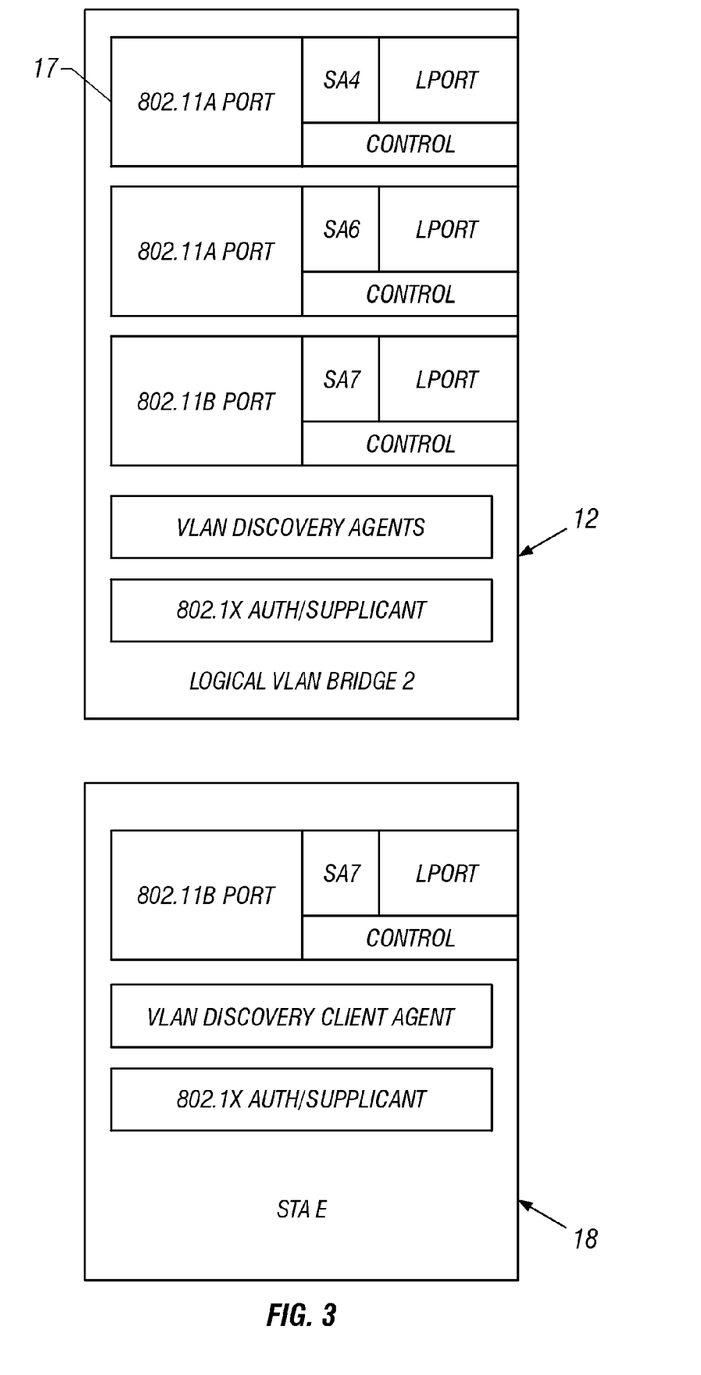
FIG. 3 is a block schematic diagram which shows an embodiment in which stations D and E belong to VLAN5, however, unlike the other stations, they do not share security associations with bridge 1, but rather with personal VLAN bridge 2.

A presently preferred embodiment of the invention is discussed herein in connection with FIGS. 1-3. It will be appreciated by those skilled in the art that the configurations shown in FIG. 1-3 are provided for purposes of example only and are not intended to limit the configurations with which the invention may be practiced.

FIG. 1 is a block schematic diagram that illustrates two bridges 10, 12. Personal VLAN Bridge 1 (10) has four physical ports 11, 13, 15, 17, two of which 11, 13 are wired Ethernet. The wired ports serve VLAN1 and VLAN2 respectively. The other two ports 15, 17 are wireless Ethernet ports. One of these ports 15 conforms to the high-rate (54 Mbps) 802.11g standard, and the other port 17 conforms to the 802.11a standard. There are three logical ports 19, 21, 23 associated with the 802.11g port. Each logical port has its own security association 25, 27, 29 which is shared by some number of end stations 20, 22, 24 to constitute a separate VLAN.

Station A 20 shares SA1 25 with bridge 1 10, as illustrated in FIG. 2. No other stations share SA1 and so STA A is in a unique VLAN, i.e. VLAN3, represented by a spanning tree whose root is bridge 1.

Stations B and C 22, 24, on the other hand, belong to VLAN4 because they share SA2 27 with bridge 1 (see FIG. 2). This VLAN was created by one of STA A or STA B. Then the other station joined it after being authenticated by the creator. This illustrates case of joining a personal VLAN (see below). VLAN4 is also represented by a spanning tree with bridge 1 as root.

Stations D 16 and E 18 belong to VLAN5. However, unlike the other stations, they do not share security associations with bridge 1 but, rather, with Personal VLAN bridge 2 12 (see FIG. 3). Bridge 2 is the root of a spanning tree for VLAN5 until the tree was extended, making bridge 1 the new root.

In one embodiment, the Personal VLAN bridge extends the standard VLAN bridge in at least any of the following ways:
  VLAN discovery: A Personal VLAN provides a protocol for VLAN discovery (discussed below).
  VLAN extension/creation: A Personal VLAN bridge allows a station to create a new port that serves a new VLAN, or to join an existing VLAN or to join an existing VLAN via an authentication protocol.
  Logical ports: A Personal VLAN bridge can maintain more than one logical port per physical port. It bridges between ports of any kind. A VLAN's member set is defined in terms of logical and physical ports. Every logical port has a lifetime controlled by the bridge.
  Cryptographic VLAN separation: In a Personal VLAN, a logical port serves at most one VLAN. However, because there may be more than one logical port per physical port, more than one VLAN may exist on a physical port. Traffic within one VLAN is separated from another VLAN on the same physical port by cryptography. An authentication code uniquely identifies the VLAN to which the traffic belongs, while another level of encryption keeps the traffic private except to members of the VLAN.
  Layer-2 VLAN support across routers: When an STA can roam and re-attach to a network at a different bridge, e.g. by associating with a new AP, the STA can inform the bridge of a VLAN to which it already belongs. The VLAN may have been created by a station, e.g. itself, at another bridge that links the VLAN with one or more logical or physical ports at that bridge. The STA can maintain its membership in the VLAN at layer 2 even though the new bridge may be located on a different subnet. This capability subsumes Mobile IP capability because Mobile IP aims to retain subnet membership for a station across routers. A subnet may correspond to a VLAN, but in general it does not.

Spanning tree maintenance: A Personal VLAN bridge permits an STA to create a VLAN where the STA itself is a bridge. A spanning tree algorithm eliminates cycles among bridges when membership is granted. The process for joining a personal VLAN enforces restrictions on VLAN topology that make re-constructing a spanning tree unnecessary after a new bridge joins a VLAN.

The presently preferred Personal VLAN bridge model parallels the VLAN model in terms of its rules for tagging frames, determining member/untagged sets, and in terms of components involved with relaying MAC frames, as described in IEEE Std 802.1Q-1998, IEEE Standards for Local and Metropolitan Area Networks: Virtual Bridged Local Area Networks, pp. 28. Extensions to these components in a Personal VLAN bridge are described below.

Personal VLAN Control Channels

Every physical port has a Personal VLAN control channel 40, 42 for sending and receiving control frames and authentication protocol frames. The channel has no security association and is identified by a frame field, e.g. Ethernet Type encoded. Authentication frames are preferably encapsulated using a format such as EAPoL (see IEEE 802.1X, IEEE Standards for Local and Metropolitan Area Networks: Port based Network Access Control, IEEE Std 802.1X-2001) which can handle a variety of authentication protocols.

VLAN Discovery

Figure 4:
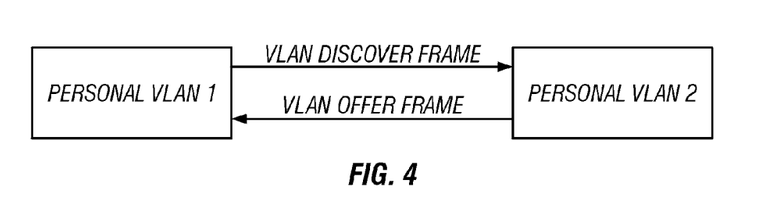
FIG. 4 is a block schematic diagram that shows Personal VLAN discovery according to the invention.

A Personal VLAN bridge runs server and client VLAN discovery agents 26 and 28, 30, respectively. The server agent responds to information requests, while the client agent issues information requests. An example of such agents is the client and server agents of the Service Location Protocol v2, IETF, RFC 2608. Therefore, a Personal VLAN can discover other VLANs and/or allow the VLANs it serves to be discovered. Discovery (see FIG. 4) involves transmission of a VLAN-DISCOVER frame. In response, a VLAN-OFFER frame is sent to the source MAC address of the discover frame. An offer frame lists all or some of the VLANs served by a bridge and information that can be used to select from among them. There may be more than one offer frame received by a client in response to a discover frame it sent. Transmission of a VLAN-OFFER frame is delayed by some randomly chosen period of time to minimize collisions among responders.

Serving a New VLAN

Figure 5:
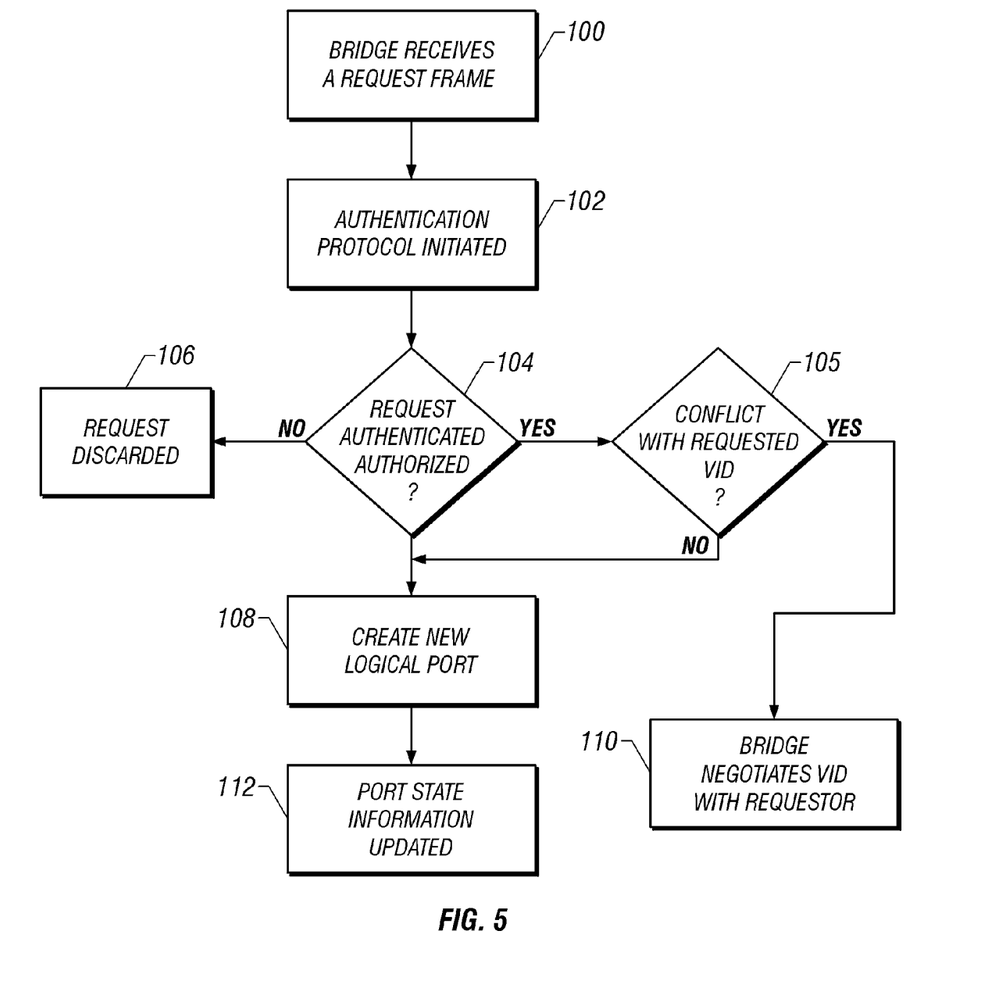
FIG. 5 is a flow diagram that shows the requesting of service for a new VLAN according to the invention.

A Personal VLAN bridge can receive a request to serve a new VLAN. The request contains the VID of the new VLAN. A request is not granted unless the requester is authorized, the request is fresh, and it can be authenticated through a control channel. To serve a new VLAN at a bridge requires making the bridge the root of a spanning tree for the named VLAN. Requesting service for a new VLAN consists of the following steps:

The bridge receives a request frame with a source MAC address through the control channel of some physical port. The holder of that MAC address is the requester (100).

Receipt of the request frame initiates an authentication protocol with the requester through the control channel (102).

If the requester cannot be authenticated, or is not authorized to request VLAN service from the bridge (104), then the request is discarded (106).

If there is no conflict in using the VID requested (105), a new logical port is created and associated with the physical port through which the request frame is received (108). This is the logical port the bridge uses to serve the VLAN. Otherwise, the bridge negotiates a VID with the requester (110). The VLAN's filtering rules are determined by a policy for the requester.

The port state information is updated for the logical port to include a security association (SA), shared with the requester that is in effect for all traffic through that port (112). Only the holder of the SA can change the logical port state Upon completion of these steps, a new logical port exists to serve the new VLAN, but the VLAN is not linked to any other VLAN served by the bridge until a request is made to join a particular VLAN. Until this time, the new VLAN is inoperable at the bridge.

Joining a VLAN

Figure 6:
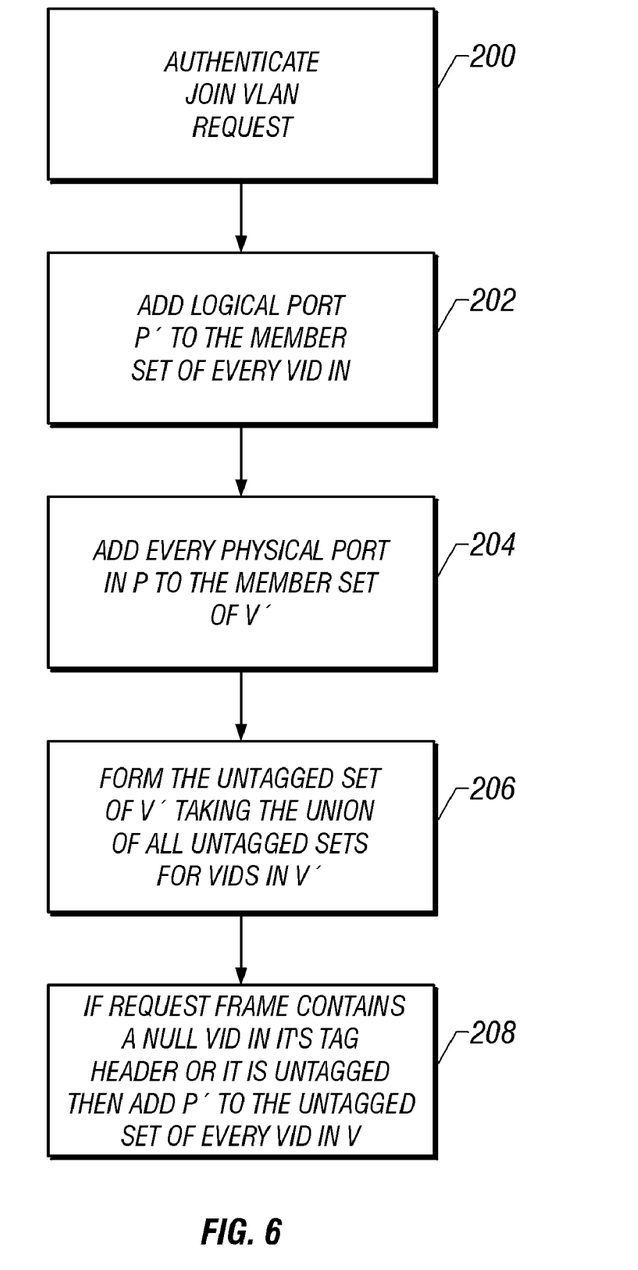
FIG. 6 is a flow diagram that shows linking of a VLAN served by a logical port at a bridge to one or more VLANs served by physical ports at a bridge according to the invention.

A new VLAN served by a bridge must extend one or more existing VLANs served by physical ports of the bridge to be useful. In other words, it must be linked to one or more existing VLANs. Linking the VLAN served by a logical port at a bridge to one or more VLANs served by physical ports at a bridge is performed through a join-VLAN request sent over a control channel. The request does not bridge the VLANs served by the physical ports. Rather, they remain separate yet the new VLAN extends all of them simultaneously.

A join-VLAN request contains the VID V' of a VLAN served by a logical port P' of the bridge, referred to herein as the source VLAN, and a set V of VIDs for VLANs served by a set of physical ports P, referred to herein as the destination VLANs. The request aims to link V' to every VLAN ID in V, or in other words, to allow the requester to join every VLAN in V. The requester has already created V'.

The bridge takes the following steps (see FIG. 6):

First the request is authenticated (200). This is done with respect to the SA associated with V' which was established when the bridge was asked to serve V'. A simple challenge-response strategy is used in the preferred embodiment, although other approaches may be used as appropriate. If authentication fails, the request is discarded.

Logical port P' is added to the member set of every VID in V (202), and every physical port in P is added to the member set of V' (204). The untagged set of V' is formed by taking a union of all untagged sets for VIDs in V (206). If the request frame contains a null VID in its tag header, or it is untagged, then P' is added to the untagged set of every VID in V (208).

The requests to serve a new VLAN and to link it to other VLANs can be combined into one request. Thus, creating a VLAN and joining another can be performed through one authentication process, specifically, the process required for serving a new VLAN.

Joining a Personal VLAN

Joining a personal VLAN, i.e. one served by a logical port, requires special treatment. A Personal VLAN bridge is not authorized to link VLANs served by logical ports because it did not create the ports, unlike its physical ports. In this case, the creator of the logical port authenticates the requester through a mutually-agreed upon protocol, for example, challenge-response. This inter-station authentication (see FIG. 7) is triggered when the bridge receives a join-VLAN request whose destination VLAN set consists of a single VLAN served by a logical port (298).

Figure 7:
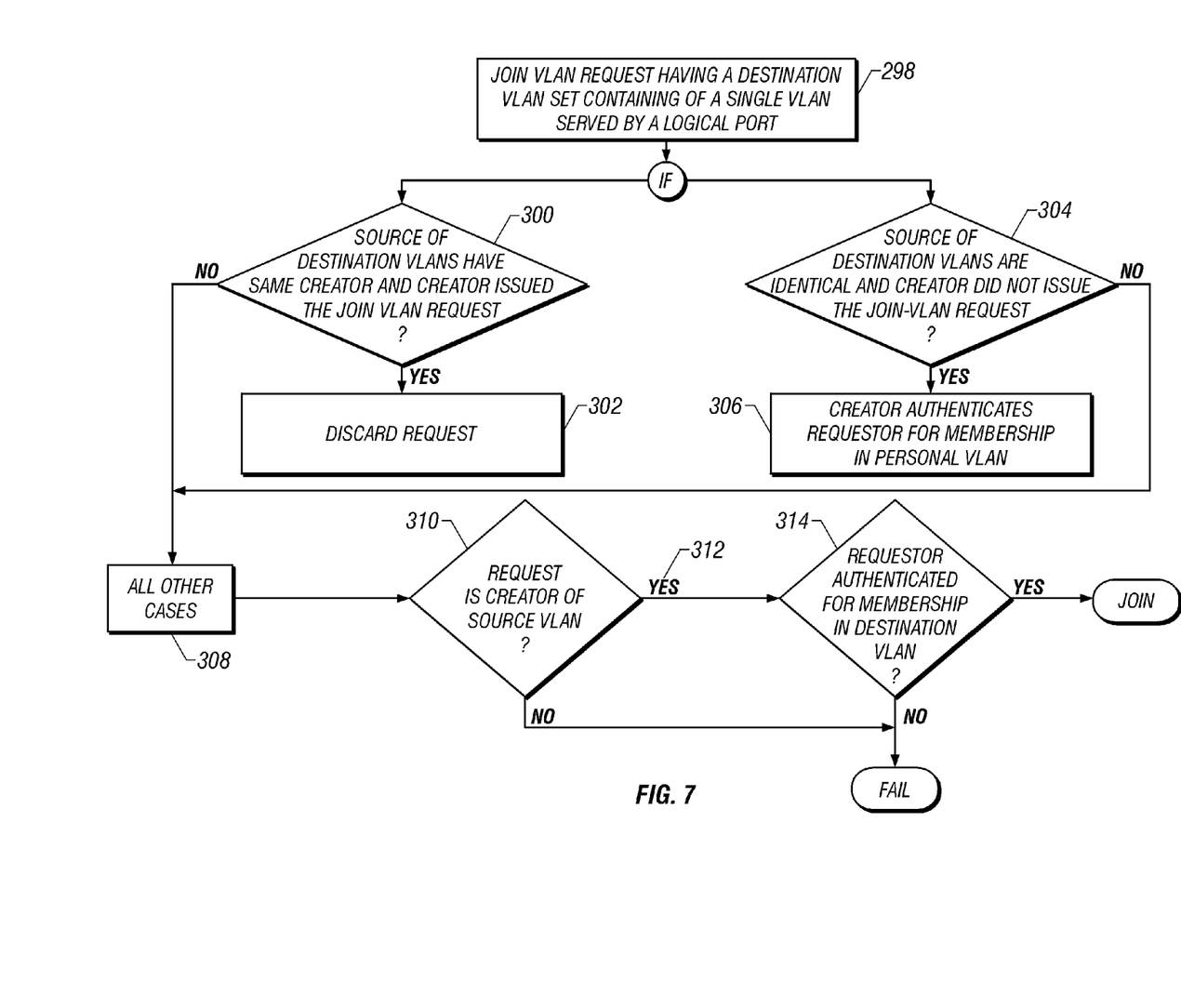
FIG. 7 is a flow diagram that shows inter-station authentication that is triggered when a bridge receives a join-VLAN request whose destination VLAN set consists of a single VLAN served by a logical port according to the invention.

There are three cases:

The source and destination VLANs have the same creator, and the creator issued the join-VLAN request (300). In this case, the request is discarded (302). Otherwise, a cycle could result in the bridged VLANs.

The source and destination VLANs are identical and the creator did not issue the request (304). In this case, the creator authenticates the requester for membership into the Personal VLAN (306).

In all other cases (308), the bridge first authenticates the request to make sure that the requester is the creator of the source VLAN (same as step 1 for joining VLANs served by physical ports only—see above) (310). If authentication succeeds (312), then the creator authenticates the requester for membership into the destination VLAN (314).

When joining a personal VLAN, the destination VLAN set is preferably limited to exactly one VLAN, i.e. the source VLAN. It is constrained in this way because the request would otherwise reflect an attempt by a station to bridge a VLAN it does not own to other VLANs, something it is not authorized to do. The owner of a VLAN can join a new VLAN and, as a result, all its member stations also become members of the new VLAN.

Authentication of a requester by a creator is facilitated by a control channel of the bridge and respective Auth/Supplicant modules 50, 52, 54. The bridge uses the channel to relay authentication protocol messages between the creator and requester. Management of the control channel and relaying messages can be implemented using, for example, IEEE 802.1X, IEEE Standards for Local and Metropolitan Area Networks: Port based Network Access Control IEEE Std 802.1X-2001. In the 802.1X model, the requester is the Supplicant and the creator is the Authenticator. If the creator can authenticate the requester, then it shares the SA it holds with the bridge with the requester as well. It is not the bridge's responsibility to decide whether it should share with the requester the SA it holds with the creator. This is the creator's responsibility. There are many ways to achieve sharing. One way is to use the requester's public key to encrypt a Transport-Layer Security (TLS v1.0) pre-master secret from which the SA could be derived at the requester's station.

Ingress Filtering at Logical Ports

A security association contains at least two keys, one for encryption and the other for computing an authentication code, referred to herein as the Message Integrity Code (MIC). Uniquely, the SA is associated with a VLAN. The authentication code is used to limit traffic at the logical port to members of an entire VLAN, while encryption keeps the traffic private except to members. Only stations having the SA belong to the VLAN. There is a single broadcast domain for each SA. All stations having the SA belong to the same broadcast domain. Therefore, no separate encryption key is needed for broadcasts.

A physical port may serve more than one VLAN by virtue of having multiple logical ports associated with it (see FIG. 1). Therefore, unless the frame received at such a port carries a VID, its VLAN classification must use rules beyond port-based classification. See IEEE 802.1Q, IEEE Standards for Local and Metropolitan Area Networks: Virtual Bridged Local Area Networks IEEE Std 802.1Q-1998, D.2.2. Otherwise, there is no way to know at this stage which VID should be assigned from among the VLANs served by the port. It is necessary to identify the logical port through which the frame is received.

Figure 8:
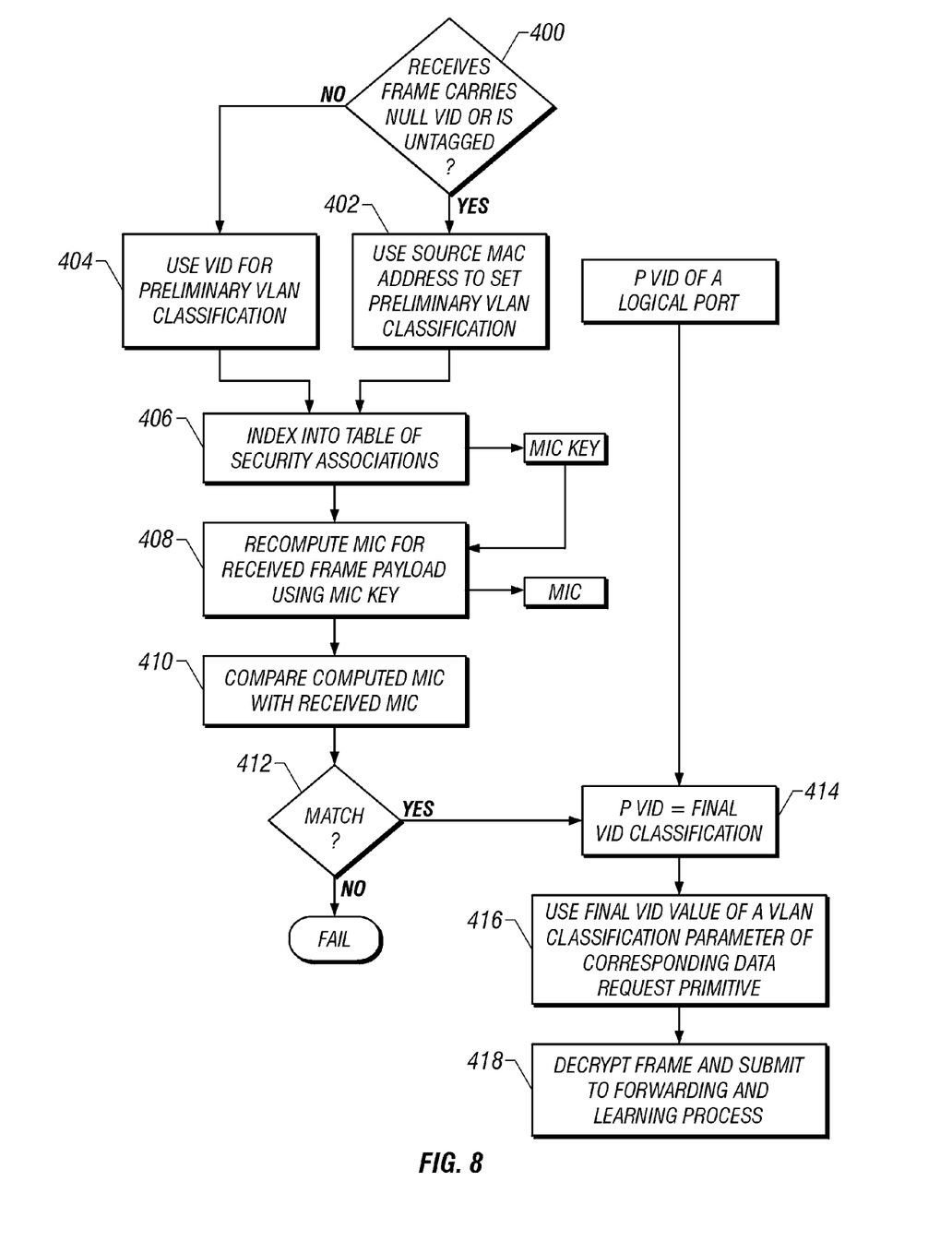
FIG. 8 is a flow diagram showing ingress filtering a logical ports according to the invention.

See FIG. 8 in connection with the following discussion. If the received frame carries a null VID or is untagged (400), then its source MAC address is used to determine a preliminary VLAN classification (402). This is the PVID of a logical port. If the frame carries a VID, then the VID is used as the preliminary classification instead (404). The preliminary classification is used to index into a table of security associations giving a MIC key (406). The received frame carries a MIC computed over the frame payload using a message digest algorithm, e.g. HMAC-MD5, agreed upon by both the bridge and requester at authentication time and recorded in the SA. The Personal VLAN bridge re-computes the MIC (408), using its MIC key, over the payload of the received frame, and then compares it with the received MIC (410). If they match (412), then the preliminary VLAN classification becomes the final VLAN classification (414). The final classification is used as the value of the VLAN classification parameter of any corresponding data request primitives (416). The frame is then decrypted, using the SA, and then submitted to the IEEE802.1Q Forwarding and Learning Processes (418). Otherwise, the frame is discarded.

Egress Filtering at Logical Ports

In the VLAN bridge model, if the transmission port for a frame that belongs to some VLAN is not in the member set of the VLAN, then the frame is discarded. The same rule applies to all logical transmission ports.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method for segregating traffic among a plurality of end stations associated with a single network access point comprising:

a first end station from among said end stations receiving frames transmitted from said single network access point, some of said frames belonging to a first subset of said end stations to which said first end stations belongs, others of said frames belonging to at least a second subset of said end stations; and for a first received frame received at said first end station;

computing a cryptographic authentication code over fields comprising said first received frame using a cryptographic message digest algorithm;

determining whether said first received frame belongs to said first subset of said end stations by comparing said computed cryptographic authentication code with a received cryptographic authentication code contained in said first received frame; and discarding said first received frame if said computed cryptographic authentication code and said received cryptographic authentication code do not match.

2. The method of claim 1 wherein said steps of computing, determining, and discarding are performed by said first end station.

3. The method of claim 1 wherein for each of said end stations, communication with said single network access point occurs over either a wired communication link or a wireless communication link.

4. The method of claim 1 wherein communication between said single network access point and said end stations occurs over a point-to-multipoint wireless network.

5. The method of claim 1 wherein said single network access point communicates with said plurality of end stations over the same wireless channel.

6. The method of claim 1 wherein said single network access point communicates with said plurality of end stations over a point-to-multipoint shared-media LAN.

7. The apparatus of claim 1, wherein traffic within one VLAN is separated from another VLAN on a same physical prot by cryptography.

8. A method for segregating traffic among a plurality of end stations associated with a single network access point comprising:
  enabling a first end station from among said end stations to perform a step of receiving frames transmitted from said single network access point, some of said frames belonging to a first subset of said end stations to which said first end station belongs, others of said frames belonging to at least a second subset of said end stations; and
  wherein for a first frame received at said first end station, said first end station is enabled to perform steps of:
    computing a cryptographic authentication code over fields comprising said first received frame using a cryptographic message digest algorithm;
    determining whether said first received frame belongs to said first subset of said end stations by comparing said computed cryptographic authentication code with a received cryptographic authentication code contained in said first received frame; and
    discarding said first received frame if said computed cryptographic authentication code and said received cryptographic authentication code do not match.

9. A method for segregating network traffic amongst a plurality of end stations in communication with a network device comprising:
  receiving from a first end station in said plurality of end stations a request to create, at said network device, a personal VLAN, wherein at least said first end station and said network device are members of said personal VLAN, and wherein said personal VLAN is a personal virtual bridged local area network;
  implementing cryptography in said personal VLAN to separate traffic in said personal VLAN from another personal VLAN; and
  identifying an authentication code that uniquely identifies said personal VLAN to which the traffic belongs.

10. The method as recited in claim 9, wherein a lifetime of said personal VLAN is controlled by said network device.

11. The method as recited in claim 9, further comprising authenticating said request to create said personal VLAN.

12. The method as recited in claim 9, further comprising receiving from one or more second end stations in said plurality of end stations requests to join said personal VLAN as members thereof.

13. The method as recited in claim 12, further comprising authenticating said requests to join said personal VLAN.

14. The method as recited in claim 12, further comprising sharing a security association among said members of said personal VLAN.

15. The method as recited in claim 14, wherein said members of said personal VLAN are configured to authenticate the origin of network traffic with encryption using said security association.

16. The method as recited in claim 14, wherein said members of said personal VLAN are configured to keep network traffic private with encryption using said security association.

17. The method as recited in claim 14, wherein said security association contains at least one key for encryption and another key for computing the authentication code, wherein said security association is associated with said personal VLAN, wherein only end stations that share said security association belong to said personal VLAN, and wherein all end stations that share said security association belong to a first broadcast domain among plural broadcast domains supported by said network device.

18. The method as recited in claim 9, further comprising discovering an existing personal VLAN.

19. The method as recited in claim 18, further comprising receiving a request to join said existing personal VLAN.

20. The method as recited in claim 19, further comprising authenticating said requests to join said existing personal VLAN.

21. The method as recited in claim 19, further comprising sharing a security association among members of said existing personal VLAN.

22. The method as recited in claim 21, wherein said members of said existing personal VLAN are configured to authenticate the origin of network traffic with encryption using said security association.

23. The method as recited in claim 21, wherein said members of said existing personal VLAN are configured to keep network traffic private with encryption using said security association.

24. The method as recited in claim 18, wherein said network device comprises an access point.

25. A network device with which a plurality of end stations are in communication comprising:
  a receiver configured to receive from a first of the plurality of end stations a request to create a personal VLAN, wherein said personal VLAN is a personal virtual bridged local area network, and wherein said personal VLAN implements cryptography to separate traffic in said personal VLAN from other personal VLANs; and
  a processor, in communication with the receiver, configured to define said personal VLAN in response to receiving said request, wherein the processor recognizes an authentication code that uniquely identifies said personal VLAN and the traffic that belongs to said personal VLAN, wherein at least said first end station and said network device are members of said personal VLAN, wherein the at least said first end station and said network device share a security association in said personal VLAN, and wherein said security association contains at least two keys, one key for encryption and another key for computing the authentication code.

26. The network device of claim 25, wherein said processor is further configured to control a lifetime of said personal VLAN.

27. The network device of claim 25, wherein said processor is further configured to authenticate said request to create a personal VLAN.

28. The network device of claim 25, further comprising an encryption engine, in communication with said processor, configured to authenticate said request to create a personal VLAN.

29. Computer readable recording media containing thereon computer readable code for segregating network traffic amongst a plurality of end stations associated with a network device that, when executed, causes one or more networked processors to perform steps of:

receiving from a first end station in said plurality of end stations a request to create, at said network device a personal VLAN, wherein at least said first end station and said network device are members of said personal VLAN, and wherein said personal VLAN is a personal virtual bridged local area network;

controlling a lifetime of said personal VLAN by said network device;

implementing cryptography in said personal VLAN to separate traffic in said personal VLAN from another personal VLAN; and identifying an authentication code that uniquely identifies said personal VLAN to which the traffic belongs.

30. Computer readable recording media containing thereon computer readable code for segregating traffic among a plurality of end stations associated with an access point that, when executed, causes the access point to perform operations comprising:

receiving a frame at the access point, wherein the frame includes a cryptographic authentication code;

if the received frame carries a null virtual LAN ID (VID) or is untagged, then using the received frame's source MAC address to determine a preliminary VLAN classification of the received frame;

if the received frame carries a VID, then using the VID as the preliminary VLAN classification instead;

using the preliminary VLAN classification to index into a table of security associations, the table giving a cryptographic authentication code key;

recomputing the cryptographic authentication code, using the cryptographic authentication code key from the table, over a payload of the received frame;

comparing the recomputed cryptographic authentication code with the received cryptographic authentication code included in the received frame;

wherein if the recomputed cryptographic authentication code and the received cryptographic authentication code match, then using the preliminary VLAN classification as a final VLAN classification and decrypting the received frame; and wherein if the recomputed cryptographic authentication code and the received cryptographic authentication code do not match, then discarding the received frame.

31. Computer readable recording media of claim 30 containing programming that, when executed, further performs operations comprising:

performing an initial authentication operation by the access point, wherein the authentication code key is generated during the initial authentication operation.

32. Computer readable recording media of claim 30 wherein the cryptographic authentication code is recomputed over the payload using a cryptographic message digest algorithm determined during an initial authentication operation.

33. Computer readable recording media of claim 30 wherein the final VLAN classification is used as a value of a VLAN classification parameter of any corresponding data request primitives.

34. Computer readable recording media of claim 30 wherein the cryptographic authentication code uniquely identifies the VLAN.

* * * * *